July 25, 1933.  A. S. FITZ GERALD  1,919,977
ELECTRIC VALVE CONVERTING APPARATUS
Filed Dec. 24, 1931
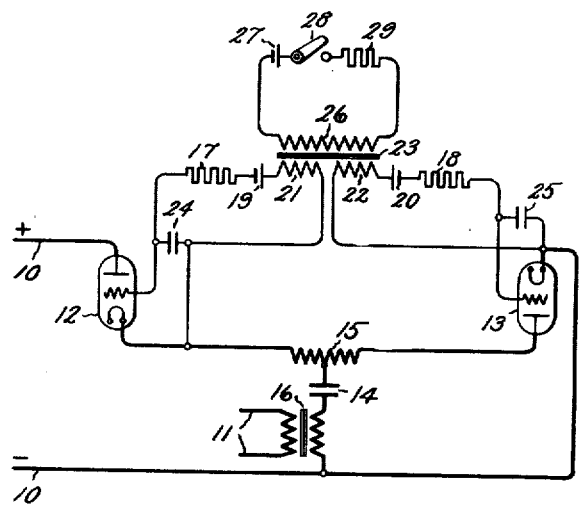
Inventor:
Alan S. FitzGerald,
by Charles E. Mullen
His Attorney.

Patented July 25, 1933

1,919,977

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRIC VALVE CONVERTING APPARATUS

Application filed December 24, 1931. Serial No. 582,987.

My invention relates to electric valve converting apparatus and more particularly to such apparatus adapted to transmit energy between direct and alternating current circuits.

Heretofore there have been devised numerous electric valve converting apparatus for transmitting energy from a direct current circuit to an alternating current circuit. The use of electric valves of the vapor electric discharge type in such converting apparatus has been found particularly advantageous because of the relatively large amounts of power which may be handled at ordinary operating voltages. One type of electric valve converting apparatus in which vapor electric discharge valves may be satisfactorily employed is known in the art as a series inverter. Such an apparatus is described and claimed in United States Letters Patent No. 1,752,247, granted March 25, 1930 upon my application. The satisfactory operation of apparatus of this type utilizing vapor electric discharge valves is predicated upon the proper control of the conductivity of the valves by their respective control grids, and it is well understood in the art that such control can be maintained only when the electric valves are deionized. In the circuit illustrated in the above mentioned patent, the time allowed for deionization of the valves corresponds to something less than one-half cycle of the alternating current output of the apparatus, and, under certain power factor conditions, it has been found that this deionization time is considerably shortened. When operating such inverters at extremely high frequencies, such for example, as used in induction furnace work, it sometimes happens that the time allowed for deionization of the valves is insufficient, with the result that their grids lose control of the conductivity of the valves and a short circuit is likely to develop upon the direct current circuit.

It is an object of my invention, therefore, to provide an improved electric valve converting apparatus of the type known in the art as a series inverter which will overcome the above mentioned disadvantages of the arrangements of the prior art and which will be simple and reliable in operation.

It is another object of my invention to provide an improved electric valve converting apparatus of the type known in the art as a series inverter which is capable of satisfactory operation at any desired frequency and in which the possibility of the occurrence of a short circuit is substantially eliminated.

It is a further object of my invention to provide an improved electric valve converting apparatus of the type known in the art as a series inverter in which each of the several electric valves is given a fixed deionization time irrespective of the operating conditions of the apparatus.

In accordance with my invention I provide a capacitor, a pair of vapor electric discharge valves, a circuit for charging the capacitor from a source of current through one of the electric valves and a circuit for discharging the capacitor including the other electric valve. An alternating current load circuit is coupled to both the charging and discharging circuits of the capacitor. The conductivity of the electric valves is controlled by connecting each grid to its respective cathode through a circuit including a source of unidirectional potential, the negative pole of which is connected to the grid, and a transformer winding, the transformer windings of the two grid circuits being mutually coupled. The transformer windings are not connected to be energized from an alternating current circuit for controlling the frequency of the current delivered to the alternating current circuit, but the frequency of the generated current depends upon the constants of the circuit and that of the load circuit. The electric valves are successively rendered conductive by the inductive kick in one winding occasioned by the interruption of the grid current of the other valve when the load current therethrough dies to zero. By connecting a condenser between the grid and cathode of each electric valve, a time delay is introduced between the interruption of the current in each valve and the starting of current in the other valve. If desired, a third winding may be coupled to the two transformer windings and connected in circuit with a source of unidirectional potential and a switch. By momentarily closing the switch, a potential is induced in the transformer windings which is of such a direction as to render only one valve conductive and initiate the operation of the apparatus. By maintaining the switch in its closed position, the mutual coupling between the two transformer windings is substantially eliminated with the result that the operation of the apparatus is interrupted.

For a better understanding of my invention, together with other and further objects thereof, reference is had to the following description taken in connection with the accompanying drawing and its scope will be pointed out in the appended claims. The single figure of the accompanying drawing illustrates an electric valve converting apparatus, of the type known in the art as a series inverter, embodying my invention.

Referring now to the drawing there is illustrated an apparatus for transmitting energy from a direct current circuit 10 to an alternating current circuit 11. This apparatus includes a pair of electric valves 12 and 13, a capacitor 14, a reactor 15 provided with an electrical midpoint, and an output transformer 16, the secondary winding of which is connected to the alternating current circuit 11. The capacitor 14 is adapted to be charged from the direct current circuit 10 through a circuit including electric valve 12, the left-hand portion of reactor 15 and the primary winding of transformer 16, while the discharge circuit for the capacitor 14 includes the right-hand portion of reactor 15, electric valve 13 and the primary winding of transformer 16. Electric valves 12 and 13 are each provided with an anode, a cathode and a control grid, and may be of any of the several types well known in the art although I prefer to use valves of the vapor electric discharge type. In order successively to render electric valves 12 and 13 alternately conductive and non-conductive, their control grids are connected to their respective cathode circuits through current limiting resistors 17 and 18, batteries 19 and 20, and inductive windings or transformer windings 21 and 22, respectively, the batteries 19 and 20 being connected in such a manner as to render the control grids negative with respect to their cathodes. Capacitors 24 and 25 are also preferably connected between the grids and cathodes of electric valves 12 and 13, respectively. The windings 21 and 22 are inductively coupled; for example, they may constitute two windings of a transformer 23. The operation of the apparatus may be started and interrupted by means of a third winding 26 of the transformer 23, which is connected in circuit with a battery 27, a switch 28 and a current limiting resistor 29 but during normal operation of the apparatus, the transformer 23 is deenergized.

The general principles of operation of the above described apparatus will be well understood by those skilled in the art or may be found explained in detail in my above mentioned patent. In brief, assuming that initially electric valve 12 is made conductive, current will flow from the upper positive direct current terminal through electric valve 12, the left-hand portion of reactor 15, capacitor 14 and through the primary winding of transformer 16 to the other side of the direct current circuit. When capacitor 14 becomes substantially completely charged this current will automatically stop. If then, electric valve 13 is made conductive, capacitor 14 will discharge through the circuit comprising the right hand portion of the reactor 15, electric valve 13 and the primary winding of the transformer 16, and this cycle may be repeated indefinitely. It will be noted that during successive half cycles the current flows in opposite directions through the primary winding of the transformer 16, thus generating an alternating potential to energize the circuit 11. It will be noted that, when current is flowing in either the charging or discharging circuits of the capacitor 14 and thus through one portion of the reactor 15, that a potential will be induced in the other portion of the reactor which opposes the flow of current in the other electric valve and thus assists in the deionization of that valve and in maintaining it non-conductive during the desired interval.

The manner in which the electric valves are successively rendered alternately conductive and non-conductive will now be explained by considering the initiation of the operation of the apparatus. Assume, for example, that the switch 28 is momentarily closed. An impulse of current will flow in the winding 26 which will induce impulses in the windings 21 and 22 of such a polarity that they will tend to render one of the electric valves, for example valve 12, conductive, and at the same time impress a negative potential upon the grid of the other electric valve. During the half cycle in which the current is flowing through electric valve 12, a current will flow in its grid circuit including the resistor 17, the battery 19, and the winding 21, the energy for this current being supplied by the battery 19. This grid current in the valve 12 consists of a positive ion current and is dependent upon the ionization of the valve 12. As soon as the capacitator 14 becomes charged and the current in the valve 12 stops, the valve 12 becomes deionized, the source of positive ions is eliminated and the grid current flowing in the winding 21 is suddenly interrupted. During this interval the battery 20 included in the grid circuit of the valve 13 has maintained this valve non-conducting, but, upon the interruption of the current in the winding 21, a potential will be induced in the winding 22 sufficient to overcome the bias of the battery 20 and render the grid of the valve 13 momentarily positive to start the current in that valve. By connecting condenser 25 between the grid and cathode of the valve 13 a predetermined time delay is introduced between the interruption of the current in the winding 21 and the initiation of current in the valve 13, as is well understood by those skilled in the art. Similarly, when the capacitor 14 becomes completely discharged so that the current in the grid circuit of the valve 13 including the winding 22 is suddenly interrupted, a positive impulse will be impressed upon the grid of the valve 12 to render that valve conductive. In this way the valves 12 and 13 will be successively rendered alternately conductive and non-conductive and there will be a predetermined time interval between the interruption of the current in one valve and the initiation of current in the other. By a proper selection of the capacitators 24 and 25 this time interval may be made sufficient to insure complete deionization of the valves 12 and 13 irrespective of the frequency at which the apparatus is operating. The operation of the apparatus may be interrupted by maintaining the switch 28 in its closed position. Under these conditions, the interruption of current in one of the windings, for example winding 21, induces a potential impulse in the windings 22 and 26. The resistor 29 included in series with the winding 26 is preferably so proportioned that the impedance of this circuit is much lower than that of the grid circuits with the result that the potential impulse in the winding 22 is substantially short-circuited; that is, the valve 13 is not rendered conductive and the operation of the apparatus is interrupted.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a source of current, a pair of vapor electric discharge valves, a capacitor, a circuit for charging said capacitor from said source including one of said valves, a circuit for discharging said capacitor including the other of said valves, an alternating current circuit associated with one of said capacitor circuits, means for successively rendering said valves alternately conductive and non-conductive, and means for providing a fixed time for deionization of said valves irrespective of the operating conditions of the apparatus.

2. In combination, a source of current, a pair of vapor electric discharge valves, a capacitor, a circuit for charging said capacitor from said source including one of said valves, a circuit for discharging said capacitor including the other of said valves, an alternating current circuit associated with one of said capacitor circuits, means for successively rendering said valves alternately conductive and non-conductive and means for introducing a predetermined time interval between the interruption of current in each valve and the starting of current in the other irrespective of the operating conditions of the apparatus.

3. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit associated with one of said capacitor circuits and a grid circuit for each of said valves including a normally deenergized transformer winding, said windings being inductively coupled.

4. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit associated with one of said circuits, and a grid circuit for each of said valves including a source of unidirectional potential and a normally deenergized transformer winding, said windings being inductively coupled.

5. In combination, a source of current, a pair of vapor electric discharge valves each provided with an anode, a cathode and a control grid, a capacitor, a circuit for charging said capacitor from said source including one of said valves, a circuit for discharging said capacitor including the other of said valves, an alternating current circuit common to said charging and discharging circuits, a grid circuit for each of said valves including a normally deenergized transformer winding and a source of unidirectional potential the negative terminal of which is connected to said grid, and a capacitor connected between the grid and cathode of each of said valves.

6. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit associated with one of said circuits, a grid circuit for each of said valves including a source of unidirectional potential and a normally deenergized transformer winding, said windings being inductively coupled and means for imparting an impulse to said windings to initiate operation of the apparatus.

7. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit associated with one of said circuits, a grid circuit for each of said valves including a source of unidirectional potential and a normally deenergized transformer winding, said windings being inductively coupled, and means for coupling a low impedance path to said windings to interrupt the operation of the apparatus.

8. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit associated with one of said circuits, a grid circuit for each of said valves including a source of unidirectional potential and a normally deenergized transformer winding, said windings being inductively coupled and a low impedance circuit including a third transformer winding coupled to said first mentioned windings, a source of unidirectional potential, and a switch for imparting an impulse to said windings to initiate the operation of the apparatus and for maintaining a closed circuit through said third winding to interrupt the operation of the apparatus.

9. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit associated with one of said capacitor circuits, and means responsive to the interruption of current in each of said circuits for impressing a positive potential impulse upon the grid of the valve included in the other circuit.

ALAN S. FITZ GERALD.